United States Patent [19]

Brown

[11] 4,170,425
[45] Oct. 9, 1979

[54] MODULAR STRUCTURAL MEMBER

[76] Inventor: Abraham H. Brown, 449 Viola Rd., Spring Valley, N.Y. 10977

[21] Appl. No.: 868,323

[22] Filed: Jan. 10, 1978

[51] Int. Cl.² ............................................. F16B 7/18
[52] U.S. Cl. ..................................... 403/296; 46/29
[58] Field of Search ................ 403/11, 406, 301, 303, 403/305, 306, 307, 43, 3, 4, 296, 292; 46/27, 28, 29

[56] References Cited

U.S. PATENT DOCUMENTS

| | | | |
|---|---|---|---|
| 1,067,819 | 7/1913 | Kemp | 403/305 X |
| 2,876,560 | 3/1959 | Henley | 46/29 X |
| 3,433,119 | 3/1969 | Ballantyne et al. | 85/32 V |

Primary Examiner—Wayne L. Shedd
Attorney, Agent, or Firm—Philip Furgang

[57] ABSTRACT

Disclosed is a modular structural member comprised of a plurality of modular elements. Fully assembled, the modular structural member is particularly suitable for furniture, toys, or the like. Each modular structural member has two rods. Disposed on each rod may be hollow wooden beads. The beads may be in the form of turnings or other decorative elements. Each rod may be threaded in one direction: the first rod being threaded in the right hand or clockwise direction and the second rod being threaded in the left hand or counterclockwise direction. A coupling, also in the shape of a turning, is internally threaded to receive at one end the clockwise threaded rod and at the other end the counterclockwise threaded rod. At the opposed and oppositely threaded ends of the rods may be disposed appropriately threaded unions. By rotation of rods by the coupling, the entire assembly is rotated into respective unions to form a secure self contained member. The beads are held securely in place and sandwiched by the unions by means of the turnbuckle effect.

31 Claims, 19 Drawing Figures

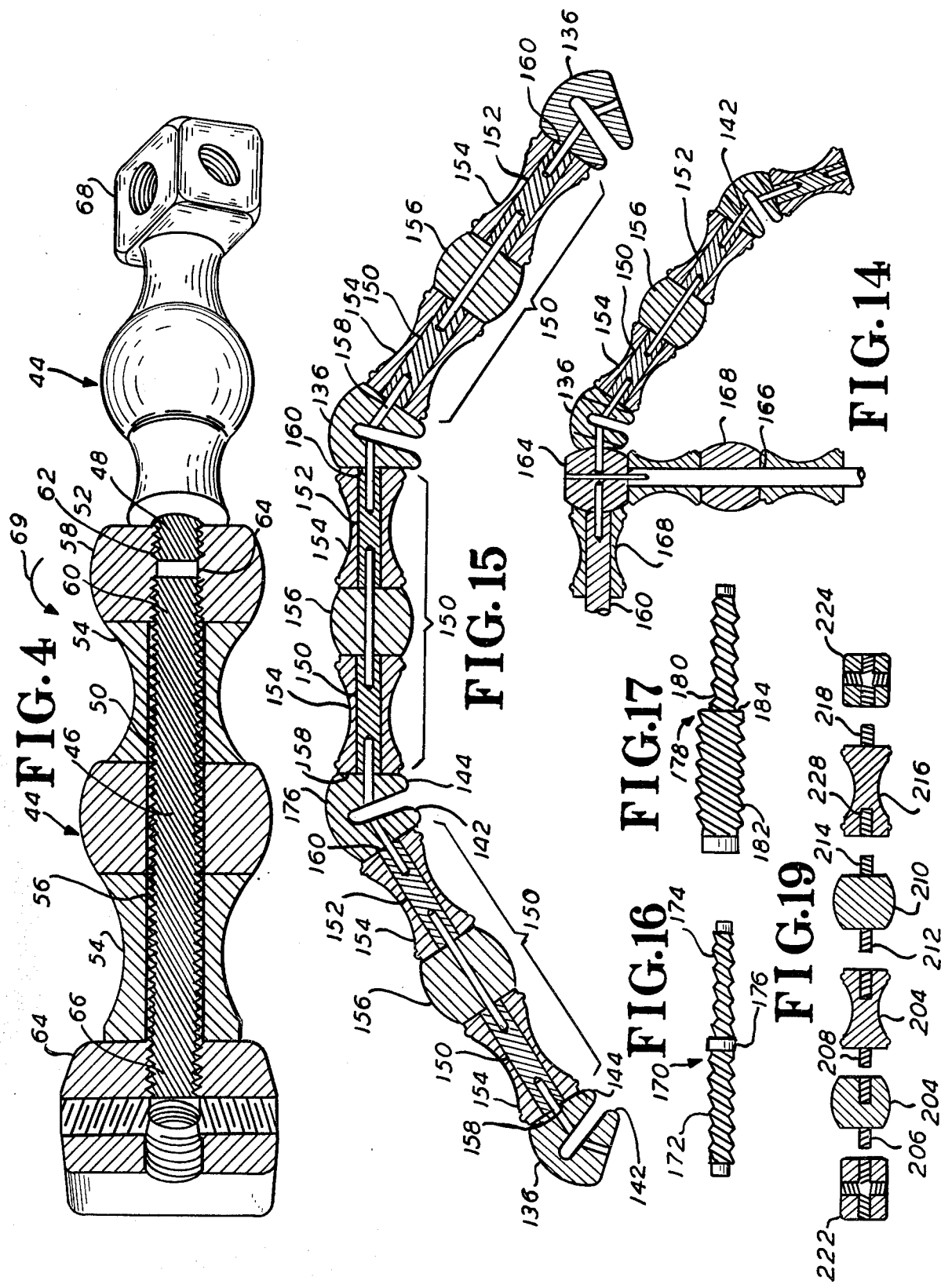

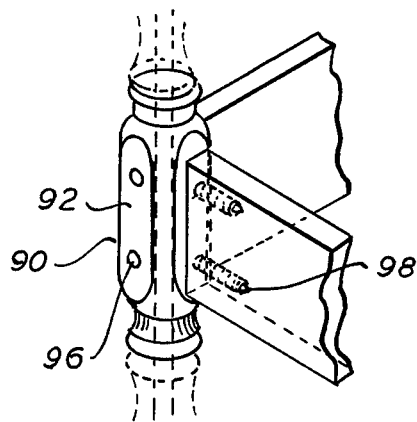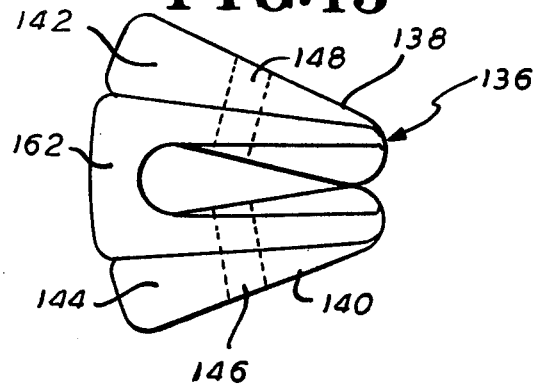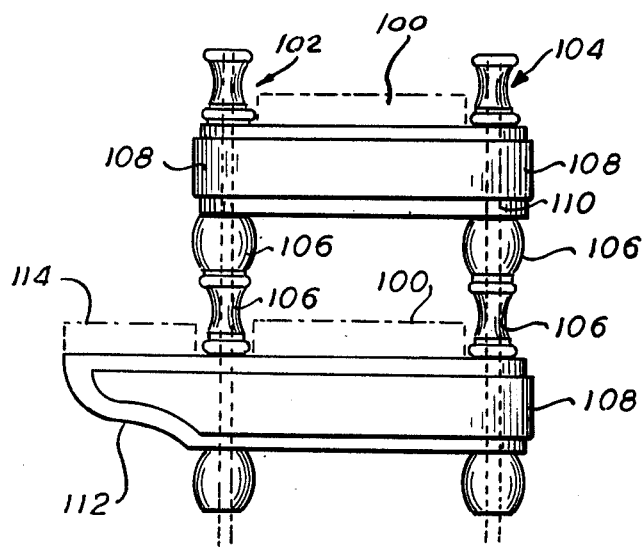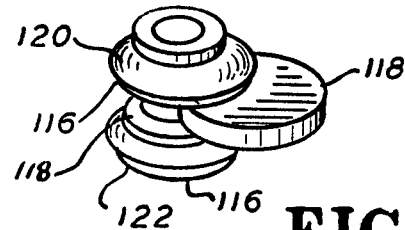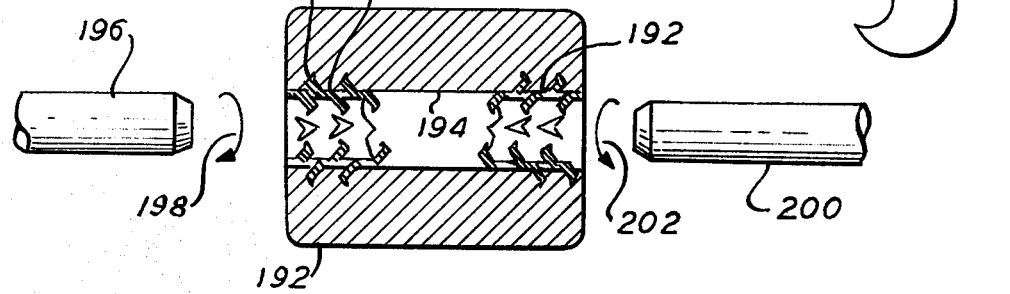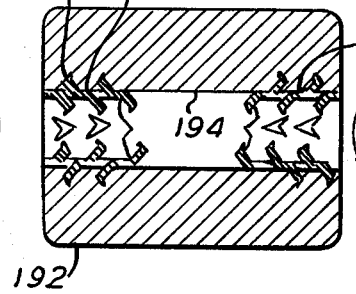

MODULAR STRUCTURAL MEMBER

BACKGROUND OF THE INVENTION

This invention relates to structures used in the assembly of furniture, toys, picture frames, and the like, and, more particularly, to a turnbuckle construction employing modular elements.

Turnings of wood, metal, plastic, or the like are both decorative and structural members and are used in the construction of furniture, toys, and the like. In the past, these complex curved surfaces were formed, as a unit, on a lathe or by casting or molding. This made for little flexibility in design selection or size. A manufacturer of furniture, or the home hobbyist, for that matter, had to either manufacture his own turnings or purchase the designs that were commercially available. In many instances, one had to "made do" with the pre-manufactured lengths and designs.

Segmented turnings—turnings in small sections which might be secured to one another to form larger units—have been available commercially. These turnings provide little satisfactory structural support. They are joined together by dowels which may be threaded or smooth. The doweled turning units are then secured to one another, for example, by an adhesive. This is an obviously time consuming and laborious task. Were such members to be joined by, for example, threading, it is believed that the joined sections could not conveniently form a closed unit. Securing elements by rotation in the same direction would loosen one side while tightening another. Forming a three dimensional object of segmented turnings under the prior art is, therefore, a laborious, time consuming, and intricate task of measurement, fitting, and securing.

Prior art suggestions have not provided any improvement.

Stonier et al., in U.S. Pat. No. 3,437,059, suggests a decorative pole made of a plurality of turnings which are threaded together in the same direction by means of a flexible connector. Such connectors are all threaded in the identical direction. The flexibility of the connectors prevents a strong interconnection. While a room divider, as disclosed, can be formed by having the connectors all threaded in the identical direction, a rigid, three dimensional structural member cannot, as indicated above, be easily made. Thus, the device disclosed by Stonier et al. would be unsuitable for use as a structural member for furniture or the like, particularly where it is desired to have a strong interconnection between the parts to have the capability of providing both support and the appearance of a unitary turning of a complicated design.

Reed, in U.S. Pat. No. 3,864,051, discloses the use of a connecting device for joining hollow tubing to a hexahedron block. However, the joining member, as taught by Reed, grasps a hollow tube immediately adjacent to the block. Thus, it would not be possible, under the teaching of the patent by Reed, to bring together a plurality of sections, such as decorative turnings, to make a complex assembly.

Morris, in U.S. Pat. No. 1,257,097, discloses a turnbuckle to join furniture sections. In the Morris device, oppositely threaded screws project from brackets in each furniture cabinet. An appropriately threaded sleeve engages both screws so that turning the sleeve in one direction draws the joined cabinets together. The sleeve is a unit and cannot be used to form a plurality of turning segments. Thus, its usefulness as a means for constructing furniture is narrowly limited.

SUMMARY OF THE INVENTION

It is an object of this invention to provide an improved structural member for use in building three dimensional portions of furniture, toys, and the like, in which decorative elements can be modularly arranged.

It is another object of this invention to provide a structural member which employs the principle of a turnbuckle to secure modular elements and forms three dimensional self-supporting structures.

It is still another object of this invention to provide a modular, ornamental structural element for use in furniture, toys, and the like, which may be assembled without the use of specialized tools or machinery.

It is a further object of this invention to provide a modularly formed structural member which is economical in manufacture and convenient and economical in use.

In fulfillment of these and other objectives, the device, according to the teachings of this invention, comprises at least first and second rod-like members. The rod-like members are releasably secured to one another for simultaneous rotation about a common axis. The rods have free ends. Means are provided for releasably engaging the free ends upon the simultaneous rotation in a first direction.

In one aspect of this invention, the first rods comprise a series of rod segments, each removably joined to one another by the rotation in the first direction.

In still another aspect of this invention, the rods have disposed thereon decorative beads which are held securely together by the engaging means.

BRIEF DESCRIPTION OF THE DRAWING

FIG. 4 is a partially sectioned perspective view of a structural member constructed in accordance with the teachings of this invention;

FIG. 8 is a perspective view of an extended collar constructed in accordance with the teachings of this invention;

FIG. 9 is a shelf assembly constructed in accordance with the teachings of the invention;

FIG. 10 is a perspective view of another shelf adapter constructed in accordance with the teachings of the invention;

FIG. 11 is a plan view of a chip used in FIG. 10;

FIG. 12 is a side view of a shelf holder constructed in accordance with the teachings of the invention;

FIG. 13 is a schematic view of a U-shaped member constructed in accordance with the teachings of the invention;

FIGS. 14 and 15 are side views of an assembly employing the U-shaped member of FIG. 13;

FIGS. 16 and 17 are connectors for interconnecting modular portions of the structural member constructed in accordance with the teachings of the invention;

FIG. 18 is a schematic side view of a connecting means for interconnecting modular portions of the structural member; and FIG. 19 is an alternative embodiment of the invention constructed in accordance with the teachings of the invention.

DESCRIPTION OF THE PREFERRED EMBODIMENTS

Figure 1:
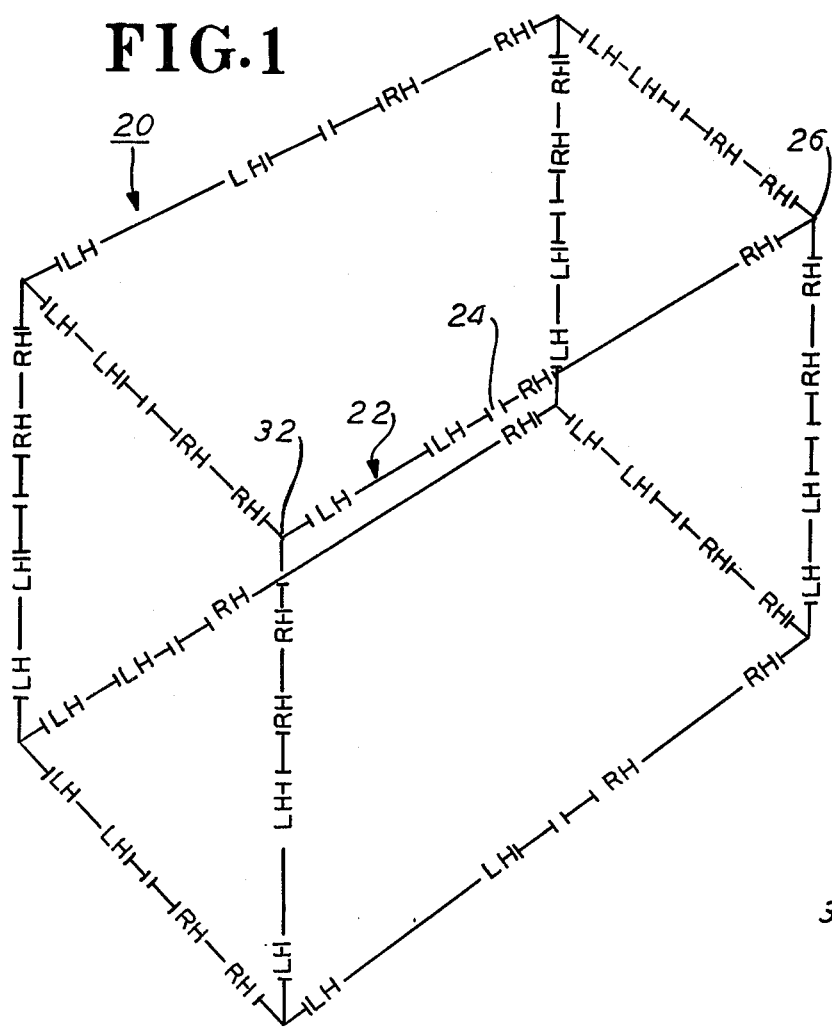
FIG. 1 is a schematic view showing a typical interrelationship of members of the modular structure of this invention.

Turning now to the drawing, there is provided a modularly assembled structural member for use in constructing three dimensional objects such as furniture, toys, and the like. At the heart of this device is the principle of the turnbuckle. This principle enables the assembling of any number of units of a rod-like member, rigidly holding itself together in a unique manner.

Figure 3:
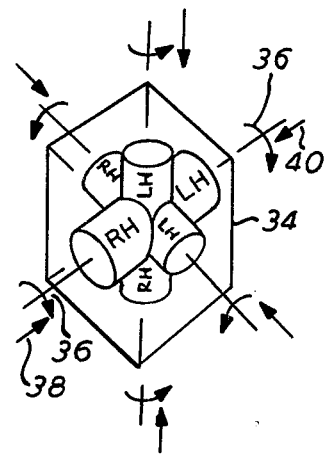
FIG. 3 is a schematic perspective view of a union constructed in accordance with the teachings of this invention.

The turnbuckle effect, as employed herein, is best expressed by a schematic drawing (FIG. 1) in which elements are represented according to screw thread engagement. Each threaded member (whether male to female or female to male) is engaged with another threaded member. The relationship of the threaded members to each other determines the turnbuckle effect. Thus, as shown schematically (FIG. 1), a box 20 may be comprised of a number of left hand threaded members (shown schematically as LH) and right hand threaded members (shown schematically as RH) disposed along each side 22. Each side 22 may have two left hand threaded members LH and two right hand threaded members RH. The left hand threaded members LH and right hand threaded members RH at the center may be joined by a coupling 24. (A schematic view of a coupling 24 is shown in FIG. 3). A coupling 24 is a member designed to receive and positively engage as, for example, through an aperture 26 in one side 28, a left hand threaded member LH and, through an aperture (not visible) in an opposed side 30, a right hand threaded member RH.

Each corner 32 of the box 20 is defined by a union 34. The union 34, as shown schematically at FIG. 3, differs from the coupling 24 only in that it can accommodate several left and right hand members LH and RH, one in each of six surfaces. If each of the threaded members LH and RH are assembled so that they are joined to the appropriately threaded portion of the coupling 24, rotation of the coupling 24 in a counterclockwise direction (arrow 36) will cause the threaded members LH and RH to move into the respective unions 34 at the corners 32 of the box 20 (arrows 38 and 40, respectively). This assumes that the coupling 24 turns with the threaded members LH and RH. Thus, the rotational joining of the various elements forces the parts to hold themselves into one self-contained modularly formed member without the need of adhesives.

In a preferred embodiment (FIG. 4), there is provided a modular structural member 44 which may be made of, for example, wood, metal, or the like. Two rods 46 and 48 are threaded along the entire length. One rod 46 is formed with a right hand thread 50. The other rod 48 is formed with a left hand thread 52. Each rod 46 and 48 is, preferably, a rigid member made of wood, plastic, or the like, and each should be strong enough to sustain the pressure of holding together each modular structural member 44, as will be more fully explained hereinafter.

Figure 2:
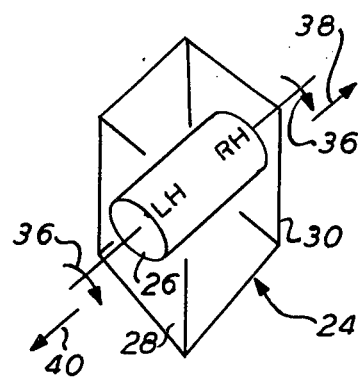
FIG. 2 is a schematic view of a coupling constructed in accordance with the teachings of this invention.

There may also be provided a plurality of beads 54. Each bead 54 may, for example, comprise a portion of a wood turning and have a generally cylindrical shape with an aperture 56 extending the length. Thus, each bead 54 may have an ornamental exterior design, such as a turning, and be open at both ends to slide easily upon either rod 46 or 48. A coupling 58, similar in construction to the schematic coupling 24 (FIG. 2), may define a portion of a turning design and also have a generally hollow, cylindrical shape, open at both ends. Unlike the beads 54, the aperture of the coupling 58 may be appropriately internally threaded to receive the respective threaded ports of the rods 46 and 48. Thus, for example, the coupling 58 may be internally right hand threaded at one end 60 and left hand threaded 62 at the opposed end. A narrowed neck portion 64 within the coupling 58 may be provided to limit the extent to which the rods 46 and 48 may enter the coupling 58. In a like manner, unions 64, constructed in accordance with the schematic union 34 (FIG. 3), are threaded to engage the opposed ends 66 of the rods 46 and 48.

In assembly, beads 54, having predetermined designs desired by the user, are threaded upon each rod 46 and 48. One end of each rod 46 or 48 is threaded into the coupling 58. The other ends of the rods 46 and 48 are threaded into unions 64 or 68, respectively. Rotation of the coupling 58 in a counterclockwise direction (arrow 69) causes the entire structure to be pulled tightly together. The effect is thereby a strong unit 44 in which the beads 54 are sandwiched between the unions 64 and 68.

The threaded rods 44 and 46 may be conveniently cut at any point, so that any desired length may be employed without special tooling. Each bead 54, coupling 58, and union 64 abut each other with planar surfaces, thereby assuring a secure and stable interconnection. It is essential that, when a rod is threaded into couplings and/or unions, that there be sufficient room within said coupling and/or unions so that the beads will be gripped securely between the couplings and/or unions. The turnbuckle effect causes the entire structure to pull in upon itself. The three dimensional aspect comes into play when it is appreciated that each union-coupling-rod combination is a self-contained unit. Other such rods and couplings may be terminated in the other threaded opening of each union 62 and 64. If, on the other hand, each part were joined by threading in the same direction, then the beads would tend to become loose upon the rod and "float." It would not be possible to form a secure box without using adhesive or other securing means.

It is not essential that each modular structural member 44 be symmetrical. Thus, for example, one rod, upon which beads may be disposed, may be used rather than two. The coupling may be joined to the rod immediately adjacent to one of the unions by a small threaded dowel (which would replace the second rod). The dowel may be secured to the coupling and threaded into the adjacent union. The only requirement is that when the coupling is rotated, the rod and dowel turn in opposite directions and into respective unions to thereby draw together.

Figure 5:
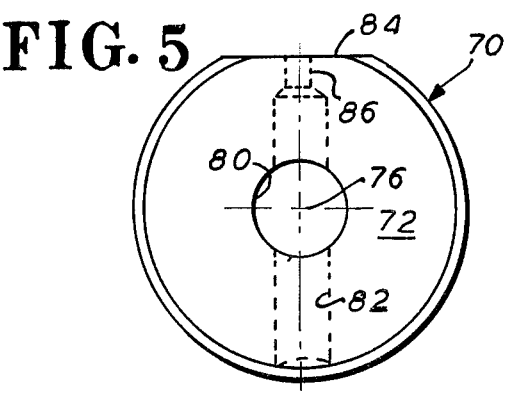
FIG. 5 is a plan view of a shelf adapter constructed in accordance with the teachings of this invention.
Figure 6:
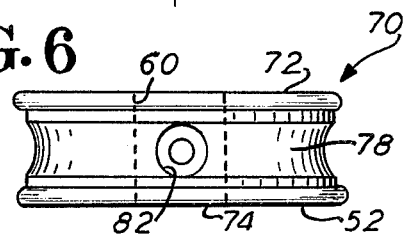
FIG. 6 is a side view of the shelf adapter taken in the direction of the arrows 6—6 of FIG. 5.

The basic assembly of the turnbuckle modular structural member 44 may now be employed in modified form to be used in conjunction with other structures and to form parts of well known pieces of furniture, toys, or the like. Thus, for example, there may be formed a collar 70 (FIGS. 5 and 6). Basically, the collar 70 may be, for example, a disc-like member of wood, plastic, or similar material. Preferably, the collar 70 may comprise two substantially circular opposed planar surfaces 72 and 74 of a disc. (The upper surface 72 is visible in FIG. 5—only the edge of the lower surface 74 is visible in FIG. 6.) The symmetrical center 76 of the collar 70 may coincide with the axial center 76. The thickness of the disc-like collar 70, which is a distance between the opposed planar circular surfaces 72 and 74, may be, for example, substantially smaller than the diameter of the planar surfaces 72 and 74. However, in the alternative, any axial length may be employed. The circularly shaped planar surfaces 72 and 74 generally define the marginal edge of a generally cylindrical side surface 78 (FIG. 6). Centrally disposed and extending through the upper and lower surfaces 72 and 74, respectively, of the collar 70 may be a cylindrically shaped aperture 80. Symmetrically disposed in the cylindrical surface 78, at the center of the axial length, may be a countersunk screw hole 82 large enough to receive a screw and screw head (not shown in FIGS. 5 and 6). The countersunk portion 82 may extend to the diameter of the collar 70.

Figure 7:
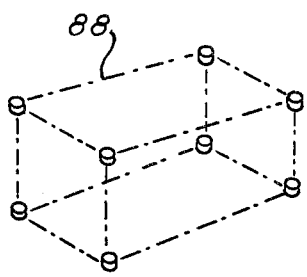
FIG. 7 is a schematic representation of shelf adapters installed on a cabinet.

The purpose or usefulness of the collar 70 may be more fully understood with reference to FIGS. 7 and 8. Thus, for example, a collar 70 may be disposed at each corner 86 of, for example, a furniture hutch 88 (shown in phantom in FIG. 7). The collars 70 may be threaded on rods and sandwiched in the same way as beads 54. Thus, the hutch 88 may become an integral part of the interconnected structural members. When the entire structure is joined by the usual unions and couplings (not shown), it forms a structurally rigid support member, the turnbuckle effect holding the collars securely between adjoining beads and unions. The collars 70 may also serve to support or be attached to shelves and the like.

Other decorative structural combinations may also be provided. Thus, for example, there may be formed an extended collar 90 (FIG. 8). The cylindrical side surface 92 may be, for example, squared off to provide, for example, at least four planar surfaces 94. Each surface 94 may have at least two countersunk screw holes 96. Each screw hole may have extending therethrough a wood screw 98. The screw 98 may be used to join the collar 90 to the paneling, shelving 100, or the like. Thus, the structural member 44 not only provides a decorative assembly, but an integral structural support.

The general principle of stringing beads upon rods suggests a number of uses, such as, for example, the formation of decorative book shelves or the like. Thus, there might be provided two parallel disposed structural members 102 and 104 (FIG. 9). Each of these structural members 102 and 104 may be assembled and function upon the same principles set forth in connection with the first structural member 44 (FIG. 4). Strung on rods (not visible) may be beads 106. At appropriate intervals, and spaced so as to be level, may be joining members 108. Each joining member 108 would have parallel apertures 110 therethrough, through which the rods may pass. The joining member 108 thereby links the two modular structural members 102 and 104. Parallel to the two members 102 and 104 may be another pair of such members (not visible) having identical beads and joining members. Shelves 100 may be supported by the joining members 108 and between the parallel members 102 and 104. Many variations are possible. Thus, one of the joining members 108 may have extending outwardly therefrom an overhang 112, so as to be able to receive yet another shelf 114.

The compressive effects of the turnbuckle can be used in many ways. Thus, for example, shelves may also be constructed by disposing, between opposed planar surfaces 116 and 118 of two beads 120 and 122, respectively, a half moon chip 124 (FIGS. 10 and 11). The extending half moon chip 124 may be used to suppport a shelf or other structural member (not shown).

Still another device employing the compressive forces established between adjacent beads may be a hook-like bracket member 126. The hook-like bracket 126 may engage a reduced neck portion 128 of a bead 130. The base 132 of the bracket 126 may extend laterally so as to support a shelf 134.

We have seen that straight modular structured members can thus be provided to hold shelves, form support for and/or be a decorative part of three dimensional furniture units in which each member is joined to another. In addition, the device of this invention can be used to form curved members. This may be accomplished, for example, by use of a U-shaped member 136 (FIGS. 13-15). This U-shaped member 136 may be used to serve the same function as any union 34 (FIG. 3)—i.e., to terminate each end of a turnbuckle member. The U-shaped member 136 may be, as may other parts herein, formed of wood, metal, plastic, or the like. The U-shaped member 136 may be provided with planar side surfaces 138 and 140 (shown in edge in FIG. 13) for abutting sides of beads, couplings, and unions. The planar side surfaces 138 and 140 define the side legs 142 and 144 of the U-shaped member 136. Extending transversely through the legs 142 and 144 of the U-shaped member 136 may be holes 146 and 148, respectively.

In assembly (FIG. 15), oppositely threaded rods 150 and 152 may have disposed upon each of them a bead 154. In this example, adjacent ends of each rod are coupled by a coupling 156. The free ends 158 and 160 of each rod 150 and 152, respectively, are secured by appropriately internally threaded apertures 146 and 148 of the U-shaped member 136. A turnbuckle set 160 comprises the leg 142 of the U-shaped member 136 joined to the rod 150 (in combination with a bead 154). The rod 150 is joined, in turn, to a coupling 156. The coupling 156 is joined to another rod 152 (in combination with a bead 154). The rod 152 is joined to a leg 142 of another U-shaped member 136.

In order to obtain the curved effect of each turnbuckle set 160, the legs 142 and 144 are canted at an acute angle with respect to the joining leg 162 (FIG. 13) of each U-shaped member 136. In addition, the legs 142 and 144 are shown moved to their most inward direction. In so doing, turnbuckle sets 160 can be assembled under tension. This is believed to aid to the rigidity of the overall assembly.

Finally, a turnbuckle set 160 may be terminated in a union 164 (FIG. 14). By way of example, the union 164 also terminates the rods 166 and beads 168 of straight turnbuckles. A number of turnbuckle sets 160 can be secured to one another to form an arc.

In interconnecting the various rods, beads, unions, and couplings, it is not considered essential that the rod be either fully or partially threaded. Thus, each rod may terminate in a threaded connector 170 (FIG. 16). The connector 170 may be made of any rigid material, such as aluminum or steel. The connector 170 may be a screw-like member, threaded 172 and 174 from each end and terminate in an unthreaded center portion 176. Still another connector 178 (FIG. 17) may, as may the first connector 170, be made of a rigid material and have a screw-like shape with threaded portions 180 and 182. One of the threaded portions 182 may have a larger diameter than the other threaded portion 180. In use, either of these connectors 170 or 178 may be threaded into pre-drilled pilot holes in unthreaded rods. The unthreaded part 176 of the first connector 170 or the shoulder 184 formed by the end of the larger diameter threaded portion 182 of the second connector 178 serve as stops to position the connectors 178 or 170 in the rods. These connectors 170 and 178 would perit the use of rods that may be cut to any desired length without the extra step of either threading the entire rod or providing rods of predetermined lengths with the ends thereof pre-threaded. Each rod will have the same threaded direction at each end.

Still another method of interconnection may be to provide means for self threading the rods. Thus, for example, the self threading means may comprise a hollow cylinder 186. The cylinder 186 may be made of, for example, steel. Poreach end.

Still another method of interconnection may be to provide means for self threading the rods. Thus, for example, the self threading means may comprise a hollow cylinder 186. The cylinder 186 may be made of, for example, steel. Portions of the cylinder 186 may have integral teeth 188 and 190 formed therein. The teeth 188 and 190 may be punched or bent in pairs, alternately inwardly 188 and outwardly 190, each pair along a common line. The teeth 188 and 190 thereby define the same threaded path—and with a minimum of cutting and/or punching. Thus, the teeth 188 and 190 may be disposed to define either left or right hand threadings. The hollow cylinders 186 may be threaded into the aperture 194 of a coupling 192. Clearly, as the cylinders 186 are rotated (either in the left hand or right hand direction, depending upon their threading), the external teeth 190 will cut or thread their way into the coupling 192, which may be made of, for example, wood. A wooden rod 196 (for example) then rotated into the right hand threaded cylinder 186 (arrow 198) will be self threaded into the coupling 192. In the same way, another unthreaded rod 200 may be threaded in a left hand or counterclockwise direction (arrow 202) into the other side of the coupling 192.

Still another alternative for the interconnection of elements to form a turnbuckle may comprise the use of unitary bead-rod elements. Thus, for example, each bead-rod 204 may have right hand threading and comprise a bead-rod 204 having a right hand threaded male portion 206 extending from one end, and an internally threaded female right hand portion at the other end 208. The coupling 210 may comprise a bead having two extending oppositely threaded male members 212 and 214. Another bead-rod 216 may have a left hand threaded male member 218 extending from one end and an internally threaded left hand male portion at the other end 220. The beads and coupling may be all interconnected, as previously indicated in connection with other structural members, and terminated in appropriately threaded unions 222 and 224, respectively (FIG. 19).

The turnbuckle, in order to be effective, must comprise at least two unions each capable of receiving a member by rotation in opposite directions. A coupling must engage each of the members for simultaneous rotation in the same direction and about a common axis. Finally, it is desirable that the combined elements form a decorative design, such as a turning. The design portion may also take the form of a more regular geometric form upon which may be disposed designs. The essential elements of the turnbuckle construction enable the modular addition of an unlimited number of elements, either in separate sections (as in FIG. 19) or as beads strung on a rod or rods (as in FIG. 4).

It is obvious that, generally, the only difference between a coupling and a union is its location with reference to the rods or members to which it is connected. The union may also be characterized by the plurality of openings for terminating other rods. However, a typical coupling may also serve in place of a union, and vice versa.

What is claimed is:

1. A modular structural member comprising:
   (a) at least first and second rod means releasably secured to one another for simultaneous rotation about a common axis and having two free ends;
   (b) means for releasably engaging said free ends of said rods upon said simultaneous rotation of said rods about said common axis and in the same direction;
   (c) means for coupling said first and second rods for said simultaneous rotation; and
   (d) at least one hollow bead member upon at least one of said rods, said bead being disposed between said engaging means and said coupling means; upon said rotation, said bead being held fixedly, with respect to said one rod, by said coupling and engaging means.

2. A modular structural member, as recited in claim 1, wherein said rods are threaded along the length thereof, said first rod being right hand threaded and said second rod being left hand threaded.

3. A modular structural member, as recited in claim 2, wherein there are a plurality of said bead members, said bead members comprise predetermined sections of turnings, there being at least one of said bead members on each of said rods, said coupling member being internally threaded to receive said rods, said engaging members being internally threaded to receive said rods, said coupling member comprises stop means for limiting the entry of said rods.

4. A modular structural member, as recited in claim 3, wherein said coupling and engaging members comprise portions of predetermined turnings and, in combination with said bead members, thereby form a unitary turning.

5. A modular structural member, as recited in claim 4, wherein at least one of said means being rigid.

6. A modular structural member, as recited in claim 4, wherein said beads are threaded slidably upon said rods.

7. A modular structural member, as recited in claim 4, wherein each of said beads comprises threaded engaging means therein; said rods comprise external threaded means for engaging said bead-threaded engaging means.

8. A modular structural member, as recited in claim 1, wherein said rods being threaded only along a portion thereof at each end and each of said ends of each of said rods being threaded in the same direction.

9. A modular structural member, as recited in claim 8, wherein there are a plurality of said bead members, said bead members comprise predetermined sections of turnings, there being at least one of said bead members on each of said rods, said coupling member being internally threaded to receive said rods, said engaging members being internally threaded to receive said rods, said coupling member comprises stop means for limiting the entry of said rods.

10. A modular structural member, as recited in claim 9, wherein said coupling and engaging members comprise portions of predetermined turnings and, in combination with said bead members, thereby form a unitary turning.

11. A modular structural member, as recited in claim 10, wherein at least one of said means being rigid.

12. A modular structural member, as recited in claim 10, wherein each of said beads comprises threaded engaging means therein; said rods comprise external threaded means for engaging said bead-threaded engaging means.

13. A modular structural member, as recited in claim 10, wherein at least one of said rods has a plurality of said bead members being slidable thereupon.

14. A modular structural member, as recited in claim 1, further comprising connector means, each of said connector means comprising two screw portions threaded from each end of said connector in the same direction.

15. A modular structural member, as recited in claim 4, wherein said threaded screw portions terminate in an unthreaded portion; said connectors each being rotatably secured in opposite ends of said rods, only one of said threaded portions of said connectors being exposed and each of said exposed threaded portions of one of said rods being threaded in the same direction and said threaded direction of said first rod connectors being opposite said second rod, said connectors being threaded into said rods, said unthreaded portion acting as a stop.

16. A modular structural member, as recited in claim 14, wherein said connector comprises one of said threaded portions having a larger diameter than said other threaded portion, said connectors each being rotatably secured in opposite ends of said rods until said larger diameter portion abuts said rod, such that each of said rods has said exposed portion of said connectors being threaded in the same direction, and said thread direction of said first rod connectors being opposite that of said second rod.

17. A modular structural member, as recited in claim 1, wherein at least one of said rods has thereupon a plurality of bead members, each of said members terminating in substantially complementary surfaces, so as to form stable abutting interconnections.

18. A modular structural member, as recited in claim 17, wherein at least one of said bead members comprises interconnecting means for securing said structural member to other objects.

19. A modular structural member, as recited in claim 18, wherein said interconnecting means comprises said bead member being a collar member with a first aperture therethrough for being received by one of said rods and at least one aperture extending transversely to said first aperture for receiving therein a screw for securing said collar to said objects, said collar having at least one planar surface through which said screw aperture extends and for engaging said object.

20. A modular structural member, as recited in claim 18, wherein said interconnecting means comprises a hook-like bracket; at least one of said members comprises a narrowed neck portion; said bracket comprises a hook portion for grasping said narrow neck and being secured between one of said abutting members, said bracket comprises an extending portion for supporting an object thereon.

21. A modular structural member, as recited in claim 18, wherein said interconnecting means comprises a substantially moon-shaped chip for being engaged between said members which are adjacent.

22. A modular structural member, as recited in claim 1, wherein said coupling and engaging members comprise means for self threading in predetermined directions, said coupling and engaging members each having apertures for receiving said rods, said self threading means being within said apertures so as to receive a rod and thread said rod into said aperture upon rotating said rod about said axis.

23. A modular structural member, as recited in claim 22, wherein said threading means comprises a rigid cylindrical tube within said aperture and further comprises a series of integrally formed internally and externally extending teeth disposed in a path defining said threading such that, upon being inserted into said aperture, said external teeth engaging in threading engagement into said member and, upon said rod being rotated into said cylinder, said rod engaging said internal teeth and being threaded thereby.

24. A modular structural member, as recited in claim 1, wherein at least one of said engaging members comprises a body portion extending in a first line and an end surface of said body portion extending substantially at an angle with reference to said body portion and said line, said end surface being engageable with one of said beads, such that said bead is thereby disposed at said angle.

25. A modular structural member, as recited in claim 24, wherein said angle is an acute angle.

26. A modular structural member, as recited in claim 25, wherein said body portion of said engaging member comprises a joining member of a substantially U-shaped member, said legs being disposed substantially inwardly of said line defined by said joining member and toward each other, said legs having apertures therein for receiving said rods, said legs being resiliently yieldable.

27. A modular structural member comprising:
(a) rod-like member means;
(b) at least two hollow beads upon said rod-like member means;
(c) means, secured to said rod-like member means, for rotating said rod-like member means; and
(d) means for engaging two opposed ends of said rod-like member means; said beads being sandwiched between said engaging means; said engaging means in combination with said rod-like member means, and said rotating means comprising a turnbuckle to thereby hold said beads securely in position, with reference to said rod-like member means.

28. A modular structural member comprising:
(a) rod-like member means having at least opposed and oppositely threaded ends;
(b) at least two hollow beads for being disposed upon said rod-like member means, each bead comprising a predetermined portion of an ornamental design;
(c) means, secured to said rod-like member means, for turning said rod-like member means about a common axis; and
(d) means for engaging said oppositely threaded ends to form, in combination with said securing means and said rod-like member means, a turnbuckle, and to bring together, in abutting relationship, said beads, to thereby form a predetermined ornamental design.

29. A modular structural member, as recited in claim 1, wherein at least one of said means being rigid.

30. A modular structural member, as recited in claim 1, wherein said bead is threaded slidably upon said rod.

31. A modular structural member, as recited in claim 1, wherein said bead comprises threaded engaging means therein; said rod comprises external threaded means for engaging said bead-threaded engaging means.

* * * * *